United States Patent [19]

Lee et al.

[11] Patent Number: 6,151,414
[45] Date of Patent: Nov. 21, 2000

[54] METHOD FOR SIGNAL ENCODING AND FEATURE EXTRACTION

[75] Inventors: Daniel D. Lee, Short Hills; Hyunjune Sebastian Seung, Hoboken, both of N.J.

[73] Assignee: Lucent Technologies Inc., Murray Hill, N.J.

[21] Appl. No.: 09/016,007

[22] Filed: Jan. 30, 1998

[51] Int. Cl.[7] .............................. G06K 9/38; G06K 9/36; G06K 9/46

[52] U.S. Cl. ......................... 382/253; 348/422; 704/222

[58] Field of Search .................................. 382/251, 253, 382/232, 156, 155, 181, 190, 209; 348/394, 398, 411–418, 422; 704/231, 232, 202, 216–219, 222, 221

[56] References Cited

U.S. PATENT DOCUMENTS

| | | | |
|---|---|---|---|
| 4,963,034 | 10/1990 | Cuperman et al. | 381/36 |
| 5,487,128 | 1/1996 | Ozawa | 395/2.31 |
| 5,727,122 | 3/1998 | Hosoda et al. | 395/2.32 |

*Primary Examiner*—Bhavesh Mehta
*Attorney, Agent, or Firm*—Gibbons, Del Deo, Dolan, Griffinger & Vecchione

[57] ABSTRACT

A new encoder is provided which operates on a database of n-dimensional signal vectors where such signal vectors are restricted to being non-negative. In the establishment of a codebook for this encoder, p signal vectors (of dimension n) are placed in an n×p matrix X, and an approximate factorization: X≈WV is constructed, where W and V are matrices whose entries are non-negative. Each column of the n×r matrix W is characterized as a "feature", such features having been "learned" from the database of n-dimensional signal vectors.

16 Claims, 5 Drawing Sheets

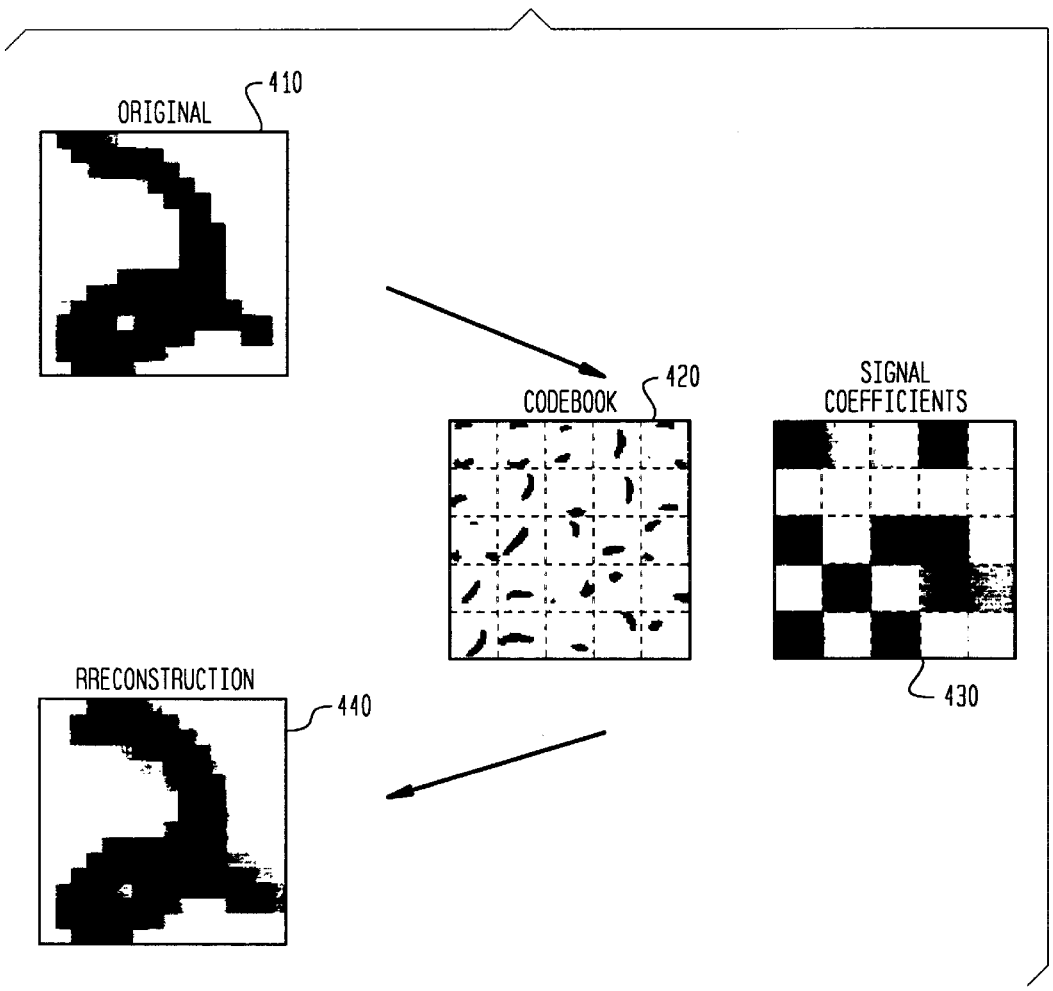

METHOD FOR SIGNAL ENCODING AND FEATURE EXTRACTION

FIELD OF THE INVENTION

This application is related to the art of signal processing, and more particularly to methods for encoding input signals in relation to a set of signals comprising a codebook.

BACKGROUND OF THE INVENTION

In the art of signal processing, particularly where the signal of interest is representative of some form of information—e.g., data, text, images, voice, video, etc., it will often be desirable to encode an input signal as a means for achieving a more efficient expression of that input signal. Such an encoding of an input signal is typically carried out by evaluating the input signal relative to a codebook established to encompass a given class of such signals.

Such a codebook may be established by operating on a large database of signals—selected from the general class of signals to be encoded—to find a small set of signals which can be used, often in a combinatorial arrangement, to represent, or encode, input signals of that general class. That small set of signals will then comprise the codebook. The operation of finding the codebook is sometimes characterized as "learning".

Two widely used learning algorithms are vector quantization (VQ) and principal component analysis (PCA), which are based on two fundamentally different ways of encoding data. In VQ, an input signal is encoded as the index of the closest codebook vector stored in memory. With PCA, on the other hand, an input signal is encoded as the coefficients of a linear superposition of a set of codebook vectors. However, neither PCA nor VQ, is able to learn a codebook consisting of vectors that are interpretable as features.

SUMMARY OF INVENTION

A new encoder is provided which operates on a database of n-dimensional signal vectors where such signal vectors are restricted to being non-negative. It is noted that in the case of signal vectors not originally being non-negative, a transformation of the signal vectors into a non-negative form will be possible in some cases. In the establishment of a codebook for this encoder, p signal vectors (of dimension n) are placed in an n×p matrix X, and an approximate factorization: X≈WV is constructed, where W and V are matrices whose entries are non-negative. Each column of the n×r matrix W is characterized as a "feature", such features having been "learned" from the database of n-dimensional signal vectors. These "features" may be applied for lossy encoding of input signal vectors, as each column of the r×p matrix V contains coefficients of a linear combination of features that approximates the corresponding column of matrix X. Such "features" and coefficients could also be applicable as the front end of a pattern recognition system. Thus, with the encoder of the invention, an input signal may be encoded as a sum of its parts, where such parts are determined from a codebook of features representing such parts.

BRIEF DESCRIPTION OF THE DRAWINGS

FIG. 4 illustrates an application of the encoding methodology of the invention

DETAILED DESCRIPTION OF THE INVENTION

The discussion following will be presented partly in terms of algorithms and symbolic representations of operations on data bits within a computer system. As will be understood, these algorithmic descriptions and representations are the means ordinarily used by those skilled in the computer processing arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantities—such terms being merely convenient labels applied to those quantities.

Figure 1:
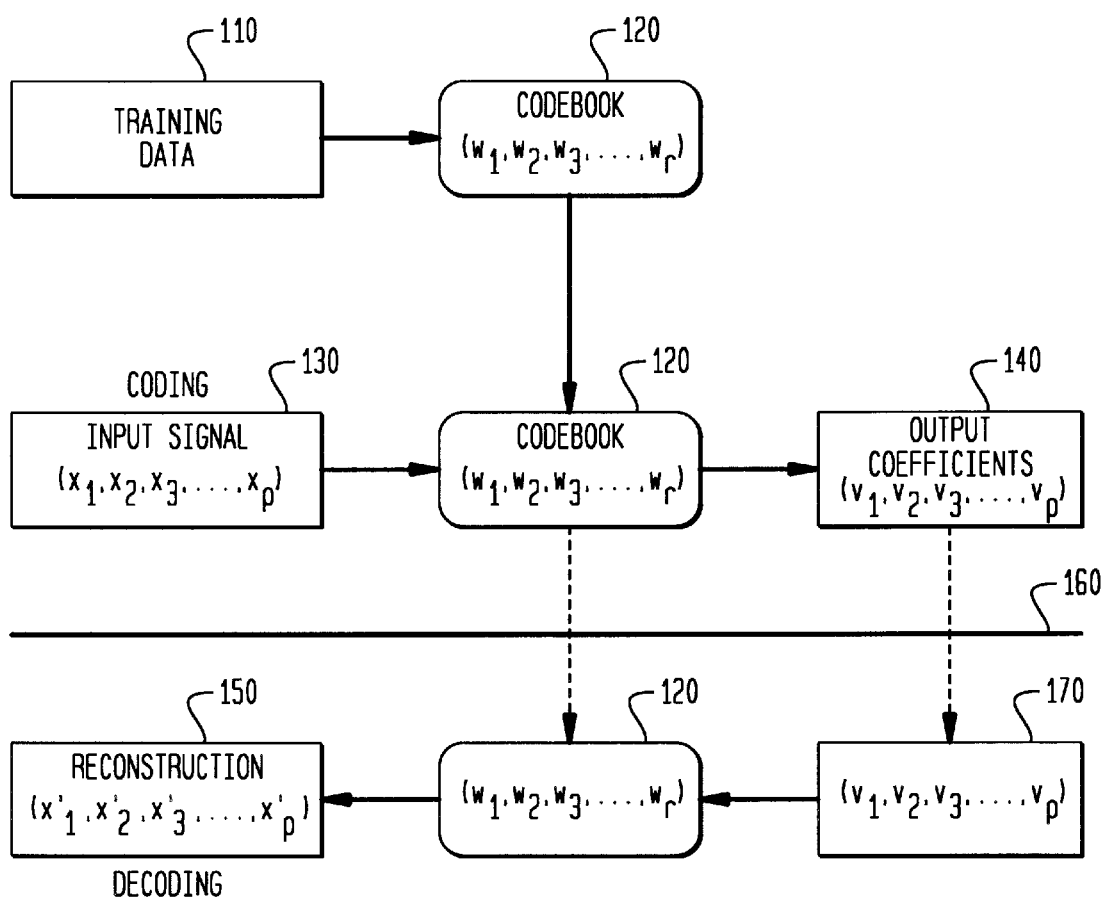
FIG. 1 provides a schematic illustration of an encoder for implementation of the method of the invention.

The process of signal encoding may be motivated by various factors, but a basic goal of all encoding is the representation of an input signal in a more "compact" version of that input signal. The overall process of signal encoding and decoding according to the method of the invention is illustrated schematically in FIG. 1. As shown in that figure, a Codebook 120, which is comprised of r codebook vectors, or "features", $\vec{w}_1, \vec{w}_2, \ldots, \vec{w}_r$, is first "learned" from a set of Training Data 110, the learning process being explained in more detail hereafter. Once the Codebook has been learned, it is then applied (as shown in the middle portion of the figure) to one or more Input Signal Vectors $\vec{x}_i$ 130 which are received as an input for encoding relative to the Codebook 120. For each of the input signal vectors, the output of such encoding is a set of Coefficients $v_1, v_2, \ldots v_r$ 140 (all non-negative, but some may be zero). For decoding of that encoded input signal, as shown in the portion of the figure below line 160, a linear combination of the vectors in Codebook 120 weighted by the coefficients v encoding that signal is formed to find a Reconstruction 150 of the encoded Input Signal Vectors.

Note that both the unknown Input Signal applied to the Codebook and the Training Data from which the Codebook is learned will in most cases be characterized by an ordered set of numerical values—e.g., pixel values for an image representing an input signal of interest—and such signals are normally represented as vectors— $\vec{x} = (x_1, x_2, x_3, \ldots x_n)$— and a set of vectors represented as columns of a matrix. This considerably simplifies the computational aspects of the learning and encoding processes through use of well-known techniques of vector/matrix algebra.

An important characteristic of the encoding methodology of the invention is found in the nature of the codebook itself and the way in which codebook vectors are combined to represent, or encode, an input signal. That methodology produces a codebook of vectors which are interpretable as features, or parts, of input signals of the general class being encoded. It thus follows that an input pattern will be encoded as a collection of parts derived from the codebook. Note, also, that this encoding-by-parts characteristic is directly related to the facet of the inventive methodology that constrains all codebook vectors and all encoding coefficients to being non-negative.

Accordingly, with the encoding method of the invention, an input pattern is encoded as a sum of its parts—using codebook features representative of incremental portions of the input signals. Both the encoding of an input signal in terms of its features, or parts, and the constraint that the codebook vectors and the encoding coefficients be non-negative are important and clear distinctions for the encoder of the invention relative to prior art encoders, which typically invoke either a "best guess" single codebook vector (as in VQ) or an unconstrained linear combination of codebook vectors (as in PCA), which in many cases are not interpretable as "parts."

In the encoding process according to the method of the invention, there are two principal steps;

(1) finding an optimum codebook—"learned" from a database of training data for the class of signals to be encoded; and (2) encoding of one or more input signals relative to the features of that codebook.

Thus, given an input "$\vec{x}$", the encoder finds a set of coefficients "$v_1, v_2, \ldots v_r$," that express "$\vec{x}$" approximately with the chosen codebook "W", that codebook being represented as a set of features ($\vec{w}_1, \vec{w}_2, \ldots, \vec{w}_r$) for the input signal class. For a given codebook, an input signal will be encoded as a set of coefficients which determine the codebook features to be combined as an encoded representation of that input signal. In essence, non-zero coefficients represent the identity and intensity of the parts encoding the input signal—i.e., the non-zero coefficients identify which parts are being used to encode the input, and the values of the non-zero coefficients relate to the intensity of the parts to which they are directed.

The learning function, from which the optimum codebook is derived, operates on a database of training data vectors of the class to be encoded through an approximate factorization of a matrix having those training data vectors as columns thereof into a matrix of codebook vectors and a matrix of coefficients representing the encoding of the input data vectors. Thus a training data vector database having p such data vectors, each of dimension n, would be formed into an n×p data matrix X. According to the method of the invention, an approximate factorization of matrix X into an n×r matrix W and an r×p matrix V would then be made, subject to the constraint that all of the entries in matrices W and V are non-negative. The matrix W will represent the codebook for the encoder of the invention, where each of the r columns of that matrix represents one codebook vector or "feature" of the input signal class. In similar fashion, the matrix V will represent the set of coefficients corresponding to the encoding of the input signal vectors of matrix X—each column of V consisting of the coefficients of a linear combination of codebook features that approximates the corresponding column of X.

The approximate factorization X≈WV is constructed by optimization of a cost function that penalizes mismatch between the matrices X and WV. One possible cost function is $$\sum_{ij} \Delta_{ij}^2, \text{ where } \Delta = X - WV \quad \text{for } i = 1 \text{ to } n, \ j = 1 \text{ to } p$$

It should, however, be understood that the principal distinctiveness of the invention is found in the idea of factorization of the input signal matrix into non-negative codebook and coefficient matrices, not in a particular method of performing such factorization. Those skilled in the art will readily understand other factorization methods which can be applied. For this illustrative cost function, the constraints on the optimization of the cost function are given by:

$$W_{ij} \geq 0 \ V_{ij} \geq 0 \text{ for all } i \text{ and } j$$

These non-negativity constraints on W and V prevent cancellations from occurring in the linear combinations.

Once a codebook has been learned for a given class of input signals, encoding of unknown input signal vectors proceeds by finding a set of coefficients, $v_i$, which encode the input signal vector in terms of the features, $w_i$, of the codebook. That encoding is found by optimization of a cost function of the form:

$$\left| \vec{x} - \sum_{i=1}^{r} \vec{w}_i v_i \right|^2$$

where the $v_i$ are constrained to be non-negative.

The cost-function optimizations described above in respect to the codebook learning function and the encoding function are carried out in practice by determining a minimum for such cost functions. Various techniques are known for such optimization and any such technique is intended to be within the contemplation of the methodology of the invention. Without in any way limiting the scope of the invention, two such optimizations are described hereafter as representing illustrative embodiments of the invention. One of those optimization techniques is commonly known as the "projected gradient method". With this method, alternating gradient descent steps in W and V are taken. After each gradient step, all negative elements of W and V are set to zero, respecting the non-negativity constraints. This process is iterated until convergence to a local minimum of the cost function is found. This optimization technique is well-known to those skilled in the art and need not be discussed further herein. Note, however, that, there may exist a number of local minima for the minimization of the described cost functions, in addition to the global minimum. Since one generally cannot be guaranteed of finding the true "optimum"—i.e., it may not be possible to find the W and V which absolutely minimize the codebook cost function, the goal is to find a minimum which is almost as good as the true minimum.

Figure 5:
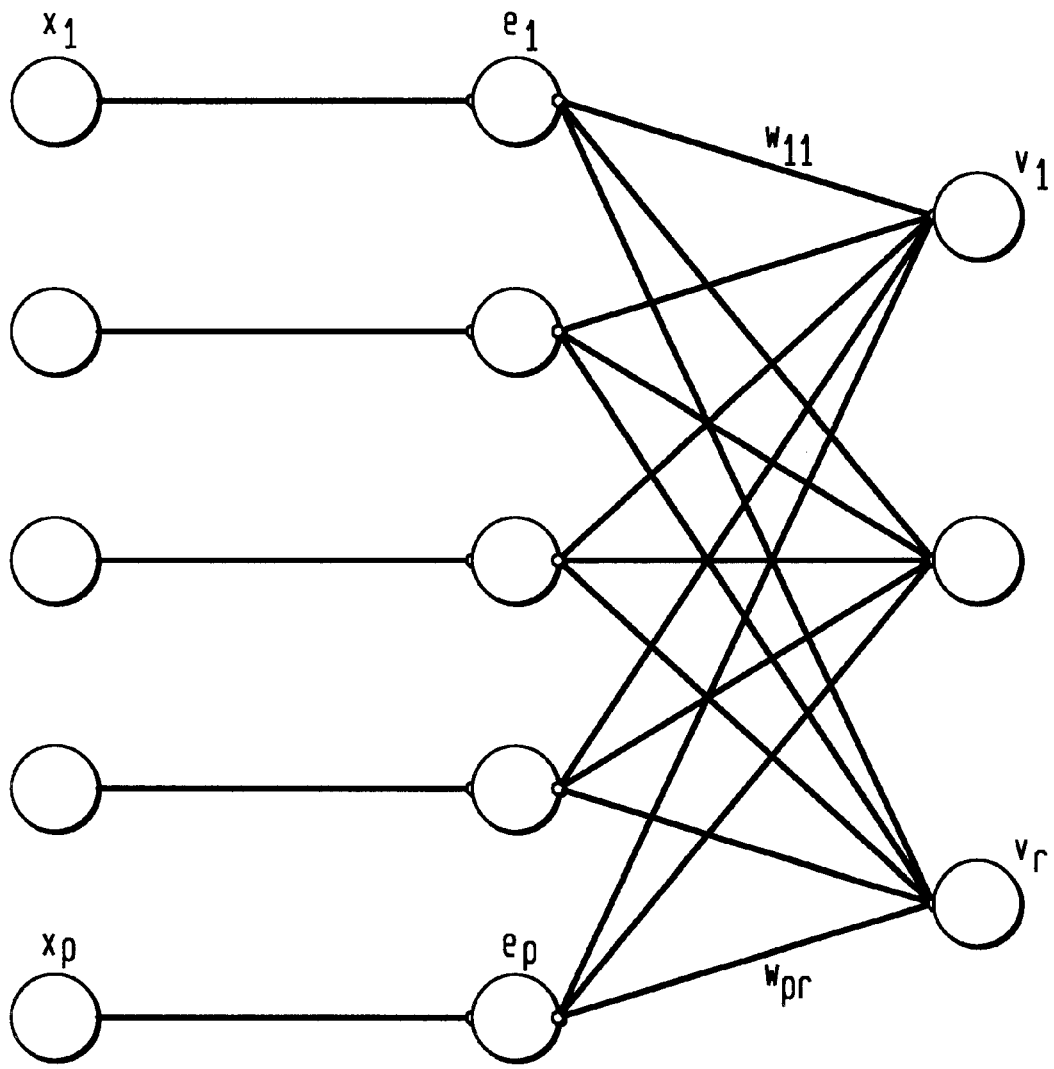
FIG. 5 provides a schematic illustration of a neural network operable to carry out the encoding method of the invention.

An alternative cost-function optimization can be carried out by use of a neural network such as illustrated in FIG. 5. Using this optimization methodology, the matrix W is interpreted as set of synaptic connections between neurons. As will be seen in the figure, the network has a layer of n error neurons $e_i$ and a layer of r encoding neurons $v_a$. For each vector x in the learning database, the neural network dynamics $$\frac{dv_a}{dt} + v_a = \left[\sum_{i=1}^{n} W_{ia}e_i + v_a\right]^+$$

$$\frac{de_i}{dt} + e_i = x_i - \sum_{a=1}^{r} W_{ia}v_a$$

are run until convergence. The rectification nonlinearity $[x]^+=\max(x,0)$ enforces the non-negativity constraint on the quantities $v_a$. After convergence, the synaptic weight update $$w_{ia}=[W_{ia}+\eta e_i v_a]_+$$

is made, where $\eta$ is a small learning rate parameter. Iterating this procedure repeatedly for each vector x in the database performs the optimization with respect to W and V.

I. Illustrative Application

In order to illustrate the efficacy of the method of the invention, the inventors have applied that encoding methodology (and, for comparison, encoders based on the prior art VQ and PCA encoding methods), to a known database of input signals. The database consisted of images of handwritten digits segmented from actual zip codes provided by the United States Postal Service. The database was divided into 7291 training and 2007 test images, each of which was normalized to a 16×16 grid with pixel intensities in the range [0,1]. The training examples were segregated by digit class and a separate codebook was learned for each of the classes for the encoding method of the invention, as well as for the VQ and PCA encoders.

Thus, for this illustrative embodiment, the learning database is a set of images, where each image is a 16×16 set of numbers. Therefore, each image may be represented by a set of 256 numbers (although many of such numbers may be zero), which in turn can be represented as a 256-dimensional vector, or a column of a matrix having 256 rows. Of the 7,291 training images in the database (for the digits "0" through "9"), there were 731 examples of the digit "2", which is selected as exemplary of the process carried by this illustrative example.

Figure 2:
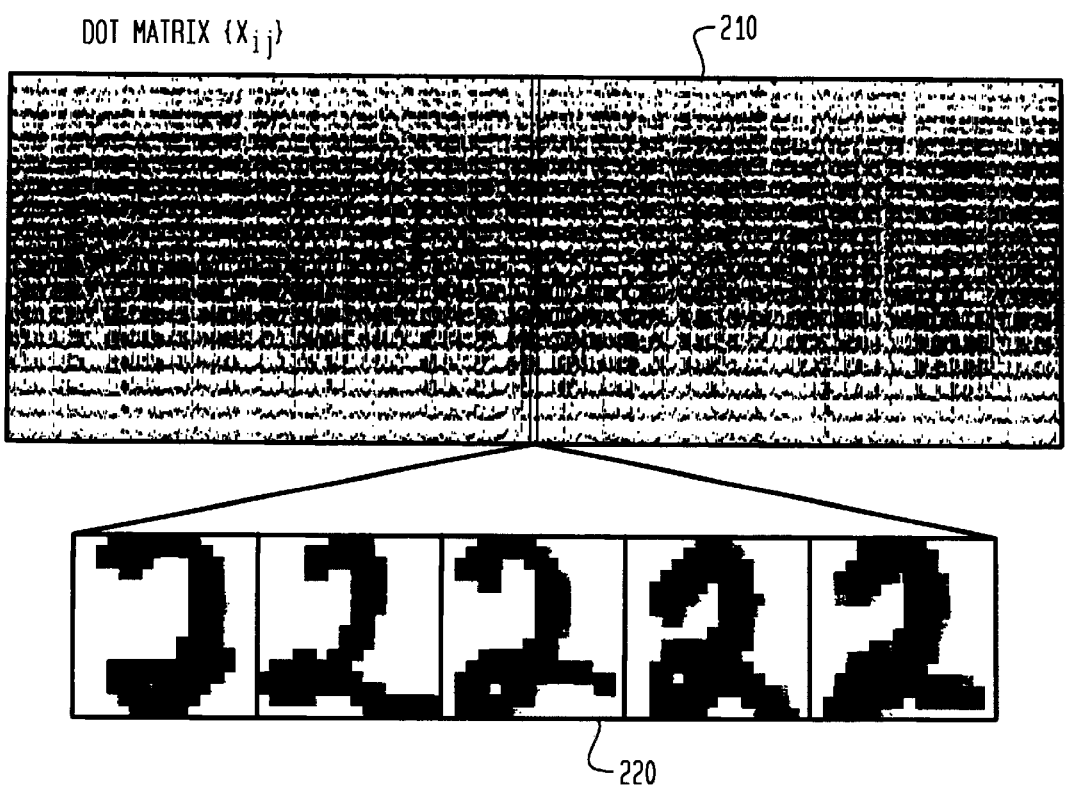
FIG. 2 illustrates a database of training data vectors such as may be used to establish a codebook according to the method of the invention.

This learning database of "2"s can be represented by a matrix of 256 rows and 731 columns (each column representing one image), which database matrix is represented by "X" in the exemplary codebook cost function described above. A graphic depiction of such a learning database is shown in FIG. 2. In that figure the signal vectors are the columns of Data Matrix $\{X_{ij}\}$ 201, where each column of the matrix is a 256-dimensional vector that is a rearrangement of a 16×16 image. An exemplary representation of a group of five of such columns (in the image representation) is shown in the exploded view 220 of the figure.

The process of the learning algorithm is therefore to find values of W and V that minimize that cost function, subject to the indicated constraints. For this illustrative example W is a matrix which is 256 ("n")×25 ("r") and V is a matrix which is 25 ("r")×731 ("p"). It is to be noted that the number of basis vectors, "r", in the codebook matrix W is determined as a matter of choice between "compactness" of the encoder and "goodness" of the reconstruction, i.e., how large a reconstruction error to accept. It should be apparent that the larger the number of basis vectors used, the lower would be the expected reconstruction error.

Figure 3A:
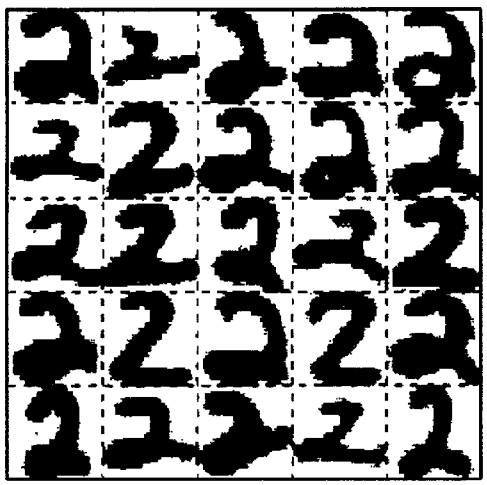
FIGS. 3A–C provide a visual depiction of sets of codebook vectors representing a codebook for the encoding methodology of the invention (FIG. 3C), as well as for two prior art encoding methods (FIGS. 3A,B).
Figure 3B:
Figure 3C:
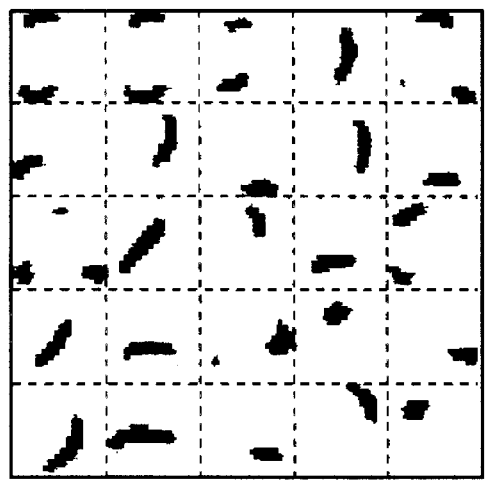

In codebook matrix W, columns are just like columns of the database matrix X—i.e., they are images. These images can be depicted in matrix form (equivalent to a table of entries) or one can take each column of the matrix and use it as a picture. Such an image representation of the codebook is shown in FIGS. 3A, 3B and 3C corresponding respectively to codebooks for VQ, PCA and the feature-based encoding method of the invention. Note that the 25 pictures of each of FIGS. 3A–C define the codebook for an encoder.

It can be seen that the codebook vectors determined by the learning algorithm for VQ (as depicted in FIG. 3A) look like "2" templates but are blurry because each codebook vector is the mean of a large number of input images. With PCA encoding (depicted in FIG. 3B), the individual codebook vectors are more difficult to interpret.

For the learning function implemented according to the method of the invention, the codebook matrix W is learned as a set of parts of an input signal, as illustrated in FIG. 3C. With this encoder, the input signal under consideration can be encoded as a combination of those parts.

The learning function of the encoder of the invention finds codebook vectors which best model the input images. An optimization of a cost function is performed by alternating between projected gradient steps of W and V. This codebook representation allows combinations of codebook vectors, but the non-negativity constraints do not permit cancellations to occur in these combinations. As a result, the codebook vectors found are features rather than templates, as can be seen in the illustrative codebook of FIG. 3C. In particular contrast to the PCA encoder, the non-negativity constraint for the encoder of the invention leads to features that are interpretable as correlated strokes.

Once the learning process has been carried out for the encoder of the invention, thereby learning a codebook from the database of learning input signal vectors, one then can take any input pattern and try to express that pattern as a linear combination of these images by adding the pieces together. For a given codebook, an input signal will be encoded as a set of coefficients which determine the codebook features to be combined as an encoded representation of that input signal.

This encoding process is illustrated graphically in FIG. 4 based on data heretofore described for this illustrative embodiment. Note that the test input image, denoted as Original 410 in the figure, was drawn from the set of 2007 test images that were previously set aside and not used for learning the codebooks. Through the learning process, operating on training data images of the "2" class, Codebook 420 was learned. The Original input image 410 was then encoded in terms of that codebook producing the Signal Coefficient matrix (also represented in graphic form) 430. Note that the "cells" of the 5×5 Signal Coefficient image which are colorless represent "0" coefficient values and the level of shading in the remaining "cells" is representative of the activity weighting for the coefficient so represented.— i.e., the non-zero coefficients represent the identity and intensity of the parts of the codebook encoding the input signal. The sparseness in the representations can be readily seen. As previously described, a Reconstruction 440 of the input image may then be made through an evaluation of the coefficients relative to the codebook.

CONCLUSION

A new encoding methodology based on a non-negative constraint for values of the codebook vectors and the encoding coefficients has been described herein. Although the present embodiment of the invention has been described in detail, it should be understood that various changes, alterations and substitutions can be made therein without departing from the spirit and scope of the invention as defined by the appended claims.

What is claimed is:

1. A method for encoding an input signal comprising the steps of:

operating on a database of signal values to provide a codebook of features representative of a general class of signals included in said signal values, wherein said codebook features are characterized as discrete portions of signals comprising said database; and encoding an unknown input signal in respect to said features of said codebook by causing said input signal to be expressed in terms of a plurality of coefficient terms and a related plurality of said codebook features, wherein said encoded input signal is expressed as a combination of said discrete portions.

2. The encoding method of claim 1 wherein said provision of said codebook includes an optimization of a predetermined cost function, said optimization being with respect to said features and said coefficient terms, and further wherein said optimization is constrained to include only non-negative values of said coefficients and of said features.

3. The encoding method of claim 2 wherein said signals, said codebook features and said coefficients are represented in terms of vector quantities and said optimization process is carried out by means of a matrix factorization process.

4. The encoding method of claim 2 wherein said optimization is implemented in a neural network.

5. A system for encoding an input signal comprising:

processor means for operating on database of signal values to provide a codebook of features representative of a general class of signals included in said signal values, wherein said codebook features are characterized as discrete portions of signals comprising said database;

encoding means for encoding an unknown input signal in respect to said features of said codebook by causing said input signal to be expressed in terms of a plurality of coefficient terms and a related plurality of said codebook features, wherein said encoded input signal is expressed as a combination of said portions of said signals.

6. The encoding system of claim 5 wherein said processor means includes a means for optimization of a predetermined cost function, said optimization being with respect to said features and said coefficient terms, and further wherein said optimization is constrained to include only non-negative values of said coefficients and of said features.

7. The encoding system of claim 6 wherein said signals, said codebook features and said coefficients are represented in terms of vector quantities and wherein said optimization means operates to carry out said optimization process using a matrix factorization process.

8. The encoding system of claim 6 wherein said optimization means is implemented as a neural network.

9. In a pattern recognition system wherein an input signal representing parameters of an unknown pattern of interest is encoded relative to a predetermined codebook and thereafter a set of decision rules is applied to said encoded signal for finding a closest match between said unknown pattern and a one of a database of known patterns, an improved method for determining said codebook and for carrying out said encoding of said input signal comprising the steps of:

operating on said database of known patterns to learn a codebook of features representative of a class of patterns included in said database, wherein said codebook features are characterized as discrete portions of patterns comprising said database; and encoding said input signal in respect to said features of said codebook by causing said input signal to be expressed in terms of a plurality of coefficient terms and a related plurality of said codebook features, wherein said encoded input signal is expressed as a combination of said portions of said signals.

10. The improved pattern recognition system of claim 9 wherein said learning of said codebook includes an optimization of a predetermined cost function, said optimization being with respect to said features and said coefficient terms, and further wherein said optimization is constrained to include only non-negative values of said coefficients and of said features.

11. The improved pattern recognition system of claim 10 wherein said signals, said codebook features and said coefficients are represented in terms of vector quantities and said optimization process is carried out by means of a matrix factorization process.

12. The improved pattern recognition system of claim 10 wherein said optimization is implemented in a neural network.

13. An encoder comprising:

learning means operating on database of training signal values to learn a codebook of features representative of a general class of signals included in said training signal values, wherein said codebook features are characterized as discrete portions of signals comprising said database;

encoding means for encoding an unknown input signal in respect to said features of said codebook by causing said input signal to be expressed in terms of a plurality of coefficient terms and a related plurality of said codebook features, wherein said encoded input signal is expressed as a combination of said portions of said signals.

14. The encoder of claim 13 wherein said learning means includes a means for optimization of a predetermined cost function, said optimization being with respect to said features and said coefficient terms, and further wherein said optimization is constrained to include only non-negative values of said coefficients and of said features.

15. The encoder of claim 14 wherein said signals, said codebook features and said coefficients are represented in terms of vector quantities and wherein said optimization means operates to carry out said optimization process using a matrix factorization process.

16. The encoder of claim 14 wherein said optimization means is implemented as a neural network.

* * * * *